(12) United States Patent
Kim

(10) Patent No.: US 10,066,941 B2
(45) Date of Patent: Sep. 4, 2018

(54) THREE-AXIS MICRO GYROSCOPE WITH RING SPRING

(71) Applicant: TLI Inc., Seongnam-si, Gyeonggi-do (KR)

(72) Inventor: Sung Wook Kim, Seoul (KR)

(73) Assignee: TLI INC., Seongnam-si, Gyeonggi-Do (KR)

( * ) Notice: Subject to any disclaimer, the term of this patent is extended or adjusted under 35 U.S.C. 154(b) by 124 days.

(21) Appl. No.: 15/122,988

(22) PCT Filed: May 27, 2014

(86) PCT No.: PCT/KR2014/004693
§ 371 (c)(1),
(2) Date: Sep. 1, 2016

(87) PCT Pub. No.: WO2015/167066
PCT Pub. Date: Nov. 5, 2015

(65) Prior Publication Data
US 2017/0074657 A1    Mar. 16, 2017

(30) Foreign Application Priority Data

Apr. 28, 2014 (KR) ......... 10-2014-0050403
May 14, 2014 (KR) ......... 10-2014-0057499

(51) Int. Cl.
G01C 19/16    (2006.01)
G01C 19/20    (2006.01)
(Continued)

(52) U.S. Cl.
CPC ................ *G01C 19/5712* (2013.01)

(58) Field of Classification Search
CPC ............. G01C 19/5747; G01C 19/5712
See application file for complete search history.

(56) References Cited

U.S. PATENT DOCUMENTS

2011/0154898 A1   6/2011   Cazzaniga et al.
2012/0006113 A1*   1/2012   Zolfagharkhani . G01C 19/5755
                                             73/504.12
(Continued)

FOREIGN PATENT DOCUMENTS

JP   2007-333643    12/2007
JP   2010-078397    4/2010
(Continued)

OTHER PUBLICATIONS

International Search Report for International Application No. PCT/KR2014/004693, dated Jan. 27, 2015.

*Primary Examiner* — Jake Cook
(74) *Attorney, Agent, or Firm* — Kile Park Reed & Houtterman PLLC

(57) ABSTRACT

Disclosed is a three-axis micro gyroscope having a ring spring. The three-axis micro gyroscope of the present invention comprises: a main spring part; a driving part; an x mass part; an y mass part; a z mass part; and a sensing part. The x mass part moves in the y axis direction depending on the contraction and expansion of the main spring part. The y mass part moves in the x axis direction depending on the contraction and expansion of the main spring part. The z mass part comprises an x vibration mass means and an y vibration mass means. The sensing part senses vibration shaking of the x mass part, the y mass part and the z mass part. The three-axis micro gyroscope of the present invention is capable of effective measurement of rotational movements for all three of the x, y and z axes.

12 Claims, 6 Drawing Sheets

(51) Int. Cl.
*G01C 19/38* (2006.01)
*G01C 19/5712* (2012.01)

(56) References Cited

U.S. PATENT DOCUMENTS

2012/0061172 A1   3/2012  Yacine
2014/0260608 A1*  9/2014  Lin .................... G01C 19/5747
                                                                73/504.12

FOREIGN PATENT DOCUMENTS

KR   10-2011-0036741   4/2011
WO      2010097356    9/2010
WO      2011/131690  10/2011

* cited by examiner

THREE-AXIS MICRO GYROSCOPE WITH RING SPRING

TECHNICAL FIELD

The present invention relates to a micro gyroscope, and more particularly, to a three-axis micro gyroscope which senses rotational movements about three spatial axes perpendicular to one another.

BACKGROUND ART

A gyroscope is a device which senses a rotational movement about a specific axis by sensing a Coriolis force generated when an angular velocity due to an external force acts on a mass body vibrating at a predetermined moving speed.

Here, the Coriolis force is proportional to an angular velocity caused by an external force and a vector product of the moving speed of the mass body. Therefore, the angular velocity may be obtained from a measured value of the Coriolis force and a known value of the moving speed of the mass body.

The gyroscope is installed in electronic devices, such as video cameras, virtual reality devices, car navigation systems, etc., to be used as a sensor for sensing camera-shake, sensing motion, sensing direction, etc., respectively. In these cases, miniaturization of the gyroscope is required for convenience of use, etc. Therefore, a micro gyroscope based on microelectromechanical systems (MEMS) technology is widely used.

Meanwhile, the micro gyroscope is used for measuring rotational movements about axes in an x-y-z coordinate system. Here, three micro gyroscopes may be arranged to measure each rotation of the three axes, however this causes an increase in cost and size.

DISCLOSURE

Technical Problem

The present invention is directed to providing a three-axis micro gyroscope capable of effectively measuring rotational movements for all three axes.

Technical Solution

One aspect of the present invention provides a three-axis micro gyroscope for measuring a rotational movement with respect to an x-axis, a y-axis, and a z-axis which are disposed perpendicular to one another and cross a virtual reference point. The three-axis micro gyroscope according to one embodiment of the present invention is provided with a main spring part having elasticity and disposed on an x-y plane in a form of a closed curve including the reference point, a driving part which contracts and expands the main spring part with respect to an x-axis direction and a y-axis direction which are complementary to each other, an x mass part coupled to the main spring part and allowed to be vibrated and shaken in the z-axis direction while the x mass part moves in the y-axis direction according to the contraction and expansion of the main spring part, an y mass part coupled to the main spring part and allowed to be vibrated and shaken in the z-axis direction while the y mass part moves in the x-axis direction according to the contraction and expansion of the main spring part, a z mass part including an x vibration mass element and a y vibration mass element, wherein the x vibration mass element is allowed to be vibrated and shaken in the x-axis direction while the x vibration mass element moves in the y-axis direction according to the contraction and expansion of the main spring part and the y vibration mass element is allowed to be vibrated and shaken in the y-axis direction while the y vibration mass element moves in the x-axis direction according to the contraction and expansion of the main spring part, and a sensing part which senses the vibration and shaking of the x mass part, the y mass part, and the z mass part.

Advantageous Effects

In a three-axis micro gyroscope having the above-described structure according to an embodiment of the present invention, rotational movements of all three axes of x, y, and z can be effectively measured.

DESCRIPTION OF DRAWINGS

A brief description of each of the drawings used in an embodiment of the present invention is provided below.

MODES OF THE INVENTION

Figure 1:
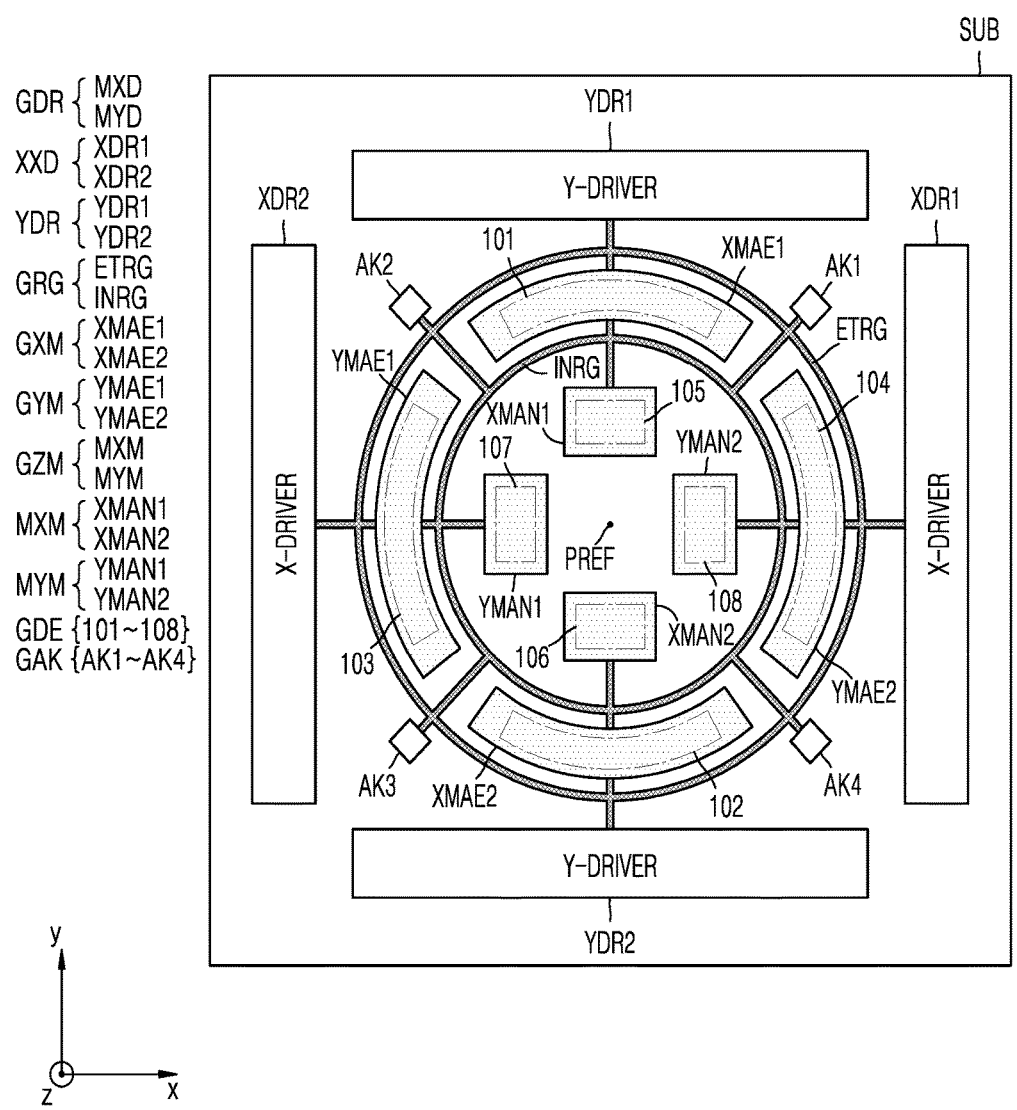
FIG. 1 is a view illustrating a three-axis micro gyroscope according to one embodiment of the present invention.

To fully understand the present invention, the advantage of an operation of the present invention, and the object to be achieved by implementing the present invention, one should refer to preferred embodiments of the present invention with reference to the accompanying drawings and contents described herein. In understanding the drawings, it is intended that the same elements be illustrated as having the same reference numerals where possible.

However, the present invention may be embodied in a different form, and is not to be construed as being limited to the embodiments set forth herein. Rather, these embodiments are provided so that this disclosure is thorough and complete and fully conveys the inventive concept to those skilled in the art.

Hereinafter, the embodiments of the present invention will be described in more detail with reference to the accompanying drawings.

FIG. 1 is a view illustrating a three-axis micro gyroscope according to one embodiment of the present invention. The three-axis micro gyroscope according to one embodiment of the present invention is for measuring rotational movements about an x-axis, a y-axis, and a z-axis. Here the x-axis, the y-axis, and the z-axis cross a virtual reference point PREF and are disposed perpendicular to one another.

Referring to FIG. 1, the three-axis micro gyroscope according to one embodiment of the present invention is provided with a main spring part GRG, a driving part GDR, an x mass part GXM, a y mass part GYM, a z mass part GZM, and a sensing part GDE.

The main spring part GRG having elasticity is disposed on an x-y plane in a form of a closed curve including the reference point PREF.

Figure 2:
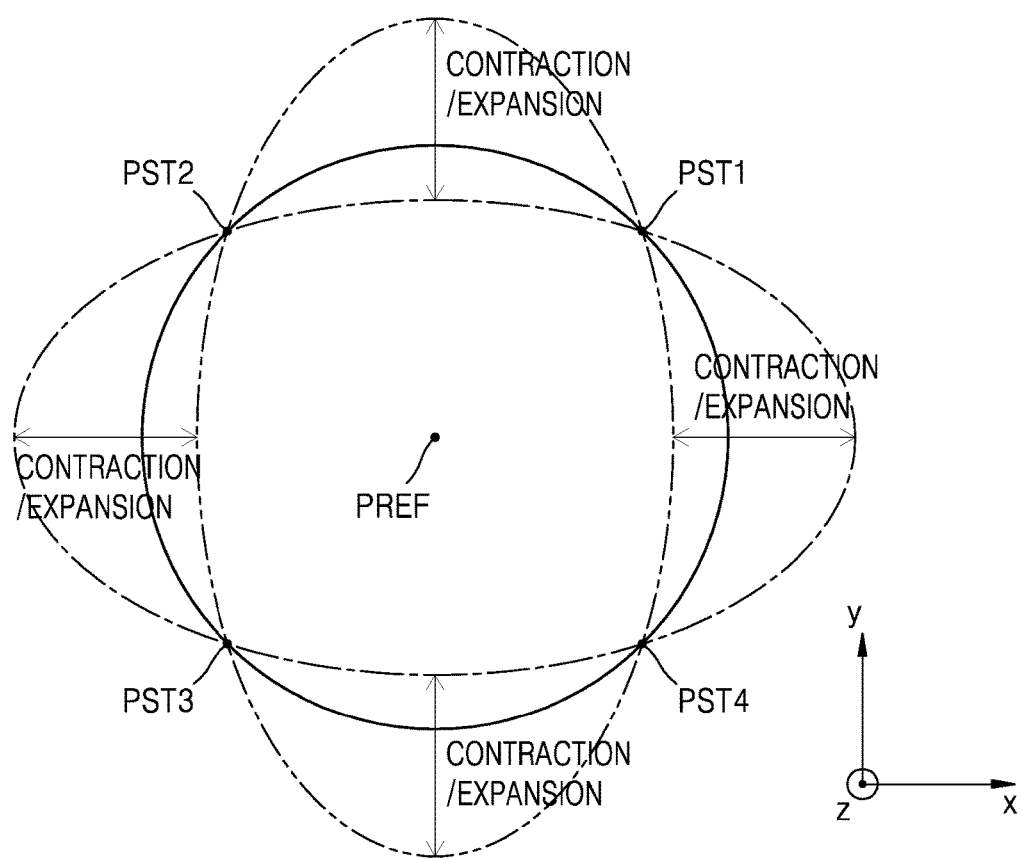
FIG. 2 is a view for describing contracted and expanded shapes of a main spring part shown in FIG. 1.

In addition, as illustrated in FIG. 2, the driving part GDR complementarily contracts and expands the main spring part GRG with respect to an x-axis direction and a y-axis direction. In other words, the main spring part GRG expands in the y-axis direction when contracting in the x-axis direction. Similarly, the main spring part GRG expands in the x-axis direction when contracting in the y-axis direction.

It is preferable that the main spring part GRG be disposed in an oval shape including the reference point PREF. In addition, it is further preferable that the main spring part GRG be disposed in a circular shape whose center is the reference point PREF.

Specifically, the main spring part is provided with an external ring spring ETRG and an internal ring spring INRG.

The external ring spring ETRG is complementarily contracted and expanded with respect to the x-axis direction and y-axis direction by the driving part GDR.

The internal ring spring INRG is included in the external ring spring ETRG and includes the reference point PREF. Here, the internal ring spring INRG is coupled to the external ring spring ETRG. Accordingly, the internal ring spring INRG also complementarily contracts and expands with respect to the x-axis direction and the y-axis direction in the same manner as the external ring spring ETRG.

Specifically, the driving part GDR is provided with an x driving element MXD and a y driving element MYD.

The x driving element MXD exerts a force on the external ring spring ETRG in the x-axis direction, and the y driving element MYD exerts a force on the external ring spring ETRG in the y-axis direction. Here, the internal ring spring INRG and the external ring spring ETRG complementarily contract and expand with respect to the x-axis direction and y-axis direction.

More specifically, the x driving element MXD is disposed on the x-axis outside the external ring spring ETRG and is provided with a first x driver XDR1 and a second x driver XDR2 disposed on opposite sides of the reference point PREF.

In addition, the y driving element MYD is disposed on the y-axis outside the external ring spring ETRG and is provided with a first y driver YDR1 and a second y driver YDR2 disposed on opposite sides of the reference point PREF.

Therefore, in the three-axis micro gyroscope according to one embodiment of the present invention, it may exert a force in a lateral direction of the x-axis and in a vertical direction of the y-axis.

The x mass part GXM is coupled to the main spring part GRG. In addition, the x mass part GXM is moved in the y-axis direction according to the contraction and expansion of the main spring part GRG. In addition, the x mass part GXM may be vibrated and shaken in a z-axis direction.

Specifically, the x mass part GXM is provided with a first external x mass body XMAE1 and a second external x mass body XMAE2. The first external x mass body XMAE1 and the second external x mass body XMAE2 are disposed on the y-axis between the external ring spring ETRG and the internal ring spring INRG. Here, the first external x mass body XMAE1 and the second external x mass body XMAE2 are disposed on opposite sides of the reference point PREF.

In addition, the first external x mass body XMAE1 and the second external x mass body XMAE2 move in the y-axis direction according to the contraction and expansion of the main spring part GRG. In addition, the first external x mass body XMAE1 and the second external x mass body XMAE2 may be vibrated and shaken in the z-axis direction. However, the first external x mass body XMAE1 and the second external x mass body XMAE2 do not generate meaningful movement with respect to the x-axis direction.

Figure 3A:
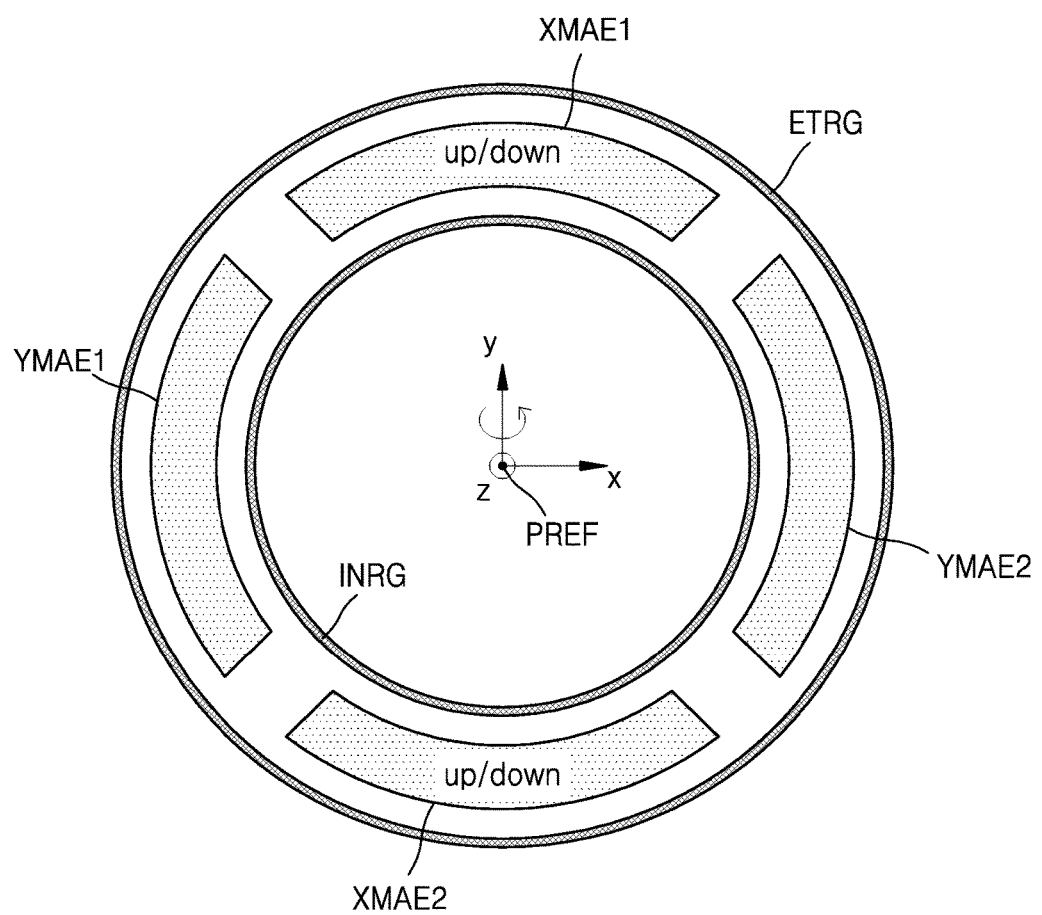
FIGS. 3A and 3B are views for describing operations of an x mass part and a y mass part shown in FIG. 1, respectively.

Accordingly, as illustrated in FIG. 3A, when rotational movement occurs with respect to the x-axis, the first external x mass body XMAE1 and the second external x mass body XMAE2 generate vibration and shaking in the z-axis direction, that is, in a vertical direction of the x-y plane.

Here, it should be obvious to those skilled in the art that the direction of the rotational movement with respect to the y-axis may be identified through a comparison between a phase and size of the vibration and shaking of the first external x mass body XMAE1 and the second external x mass body XMAE2 and a phase and size of the contraction and expansion of the main spring part GRG.

Continuing to refer to FIG. 1, the y mass part GYM is coupled to the main spring part GRG. The y mass part GYM moves in the x-axis direction according to the contraction and expansion of the main spring part GRG. In addition, the y mass part GYM may be vibrated and shaken in the z-axis direction.

Specifically, the y mass part GYM is provided with a first external y mass body YMAE1 and a second external y mass body YMAE2. The first external y mass body YMAE1 and the second external y mass body YMAE2 are disposed on the x-axis between the external ring spring ETRG and the internal ring spring INRG. Here, the first external y mass body YMAE1 and the second external y mass body YMAE2 are disposed on opposite sides of the reference point PREF.

In addition, the first external y mass body YMAE1 and the second external y mass body YMAE2 move in the x-axis direction according to the contraction and expansion of the main spring part GRG. In addition, the first external y mass body YMAE1 and the second external y mass body YMAE2 may be vibrated and shaken in the z-axis direction. However, the first external y mass body YMAE1 and the second external y mass body YMAE2 do not generate meaningful movement with respect to the y-axis direction.

Figure 3B:
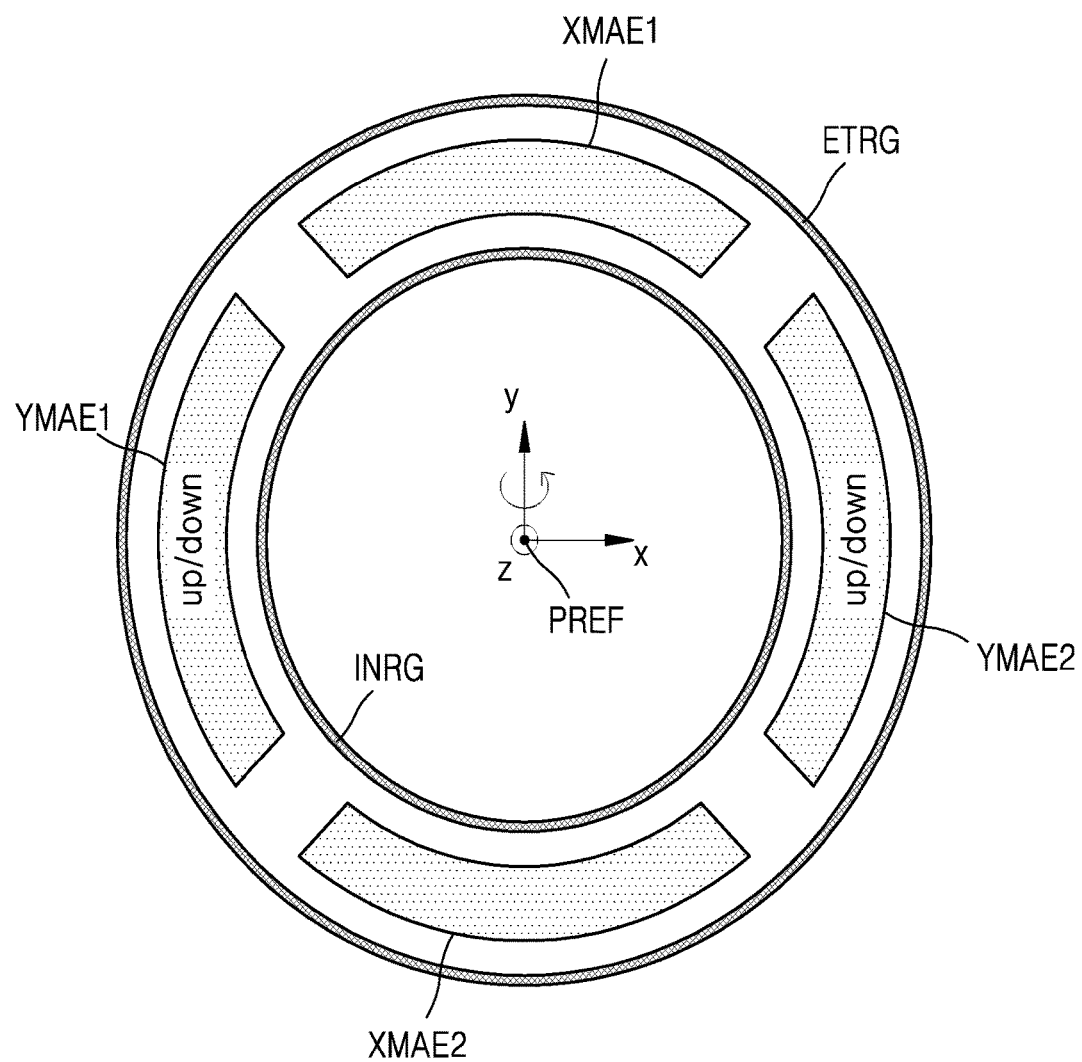

Accordingly, as illustrated in FIG. 3B, when rotational movement occurs with respect to the y-axis, the first external y mass body YMAE1 and the second external y mass body YMAE2 generate vibration and shaking in the z-axis direction, that is, in the vertical direction of the x-y plane.

Here, it should be obvious to those skilled in the art that the direction of the rotational movement with respect to the x-axis may be identified through a comparison between a phase and size of the vibration and shaking of the first external y mass body YMAE1 and the second external y mass body YMAE2, and a phase and size of the contraction and expansion of the main spring part GRG.

Continuing to refer to FIG. 1, specifically, the z mass part GZM includes an x vibration mass element MXM and a y vibration mass element MYM.

Here, the x vibration mass element MXM moves in the y-axis direction according to the contraction and expansion of the main spring part GRG and the x vibration mass element MXM may be vibrated and shaken in the x-axis direction. In addition, the y vibration mass element MYM moves in the x-axis direction according to the contraction and expansion of the main spring part GRG and the y vibration mass element MYM may be vibrated and shaken in the y-axis direction.

Specifically, the x vibration mass element MXM is provided with a first internal x mass body XMAN1 and a second internal x mass body XMAN2. The first internal x mass body XMAN1 and the second internal x mass body XMAN2 are disposed on the y-axis in the internal ring spring INRG and disposed on opposite sides of the reference point PREF.

In addition, the first internal x mass body XMAN1 and the second internal x mass body XMAN2 move in the y-axis direction according to the contraction and expansion of the main spring part GRG. In addition, the first internal x mass body XMAN1 and the second internal x mass body XMAN2 may be vibrated and shaken toward the x-axis direction.

Figure 4:
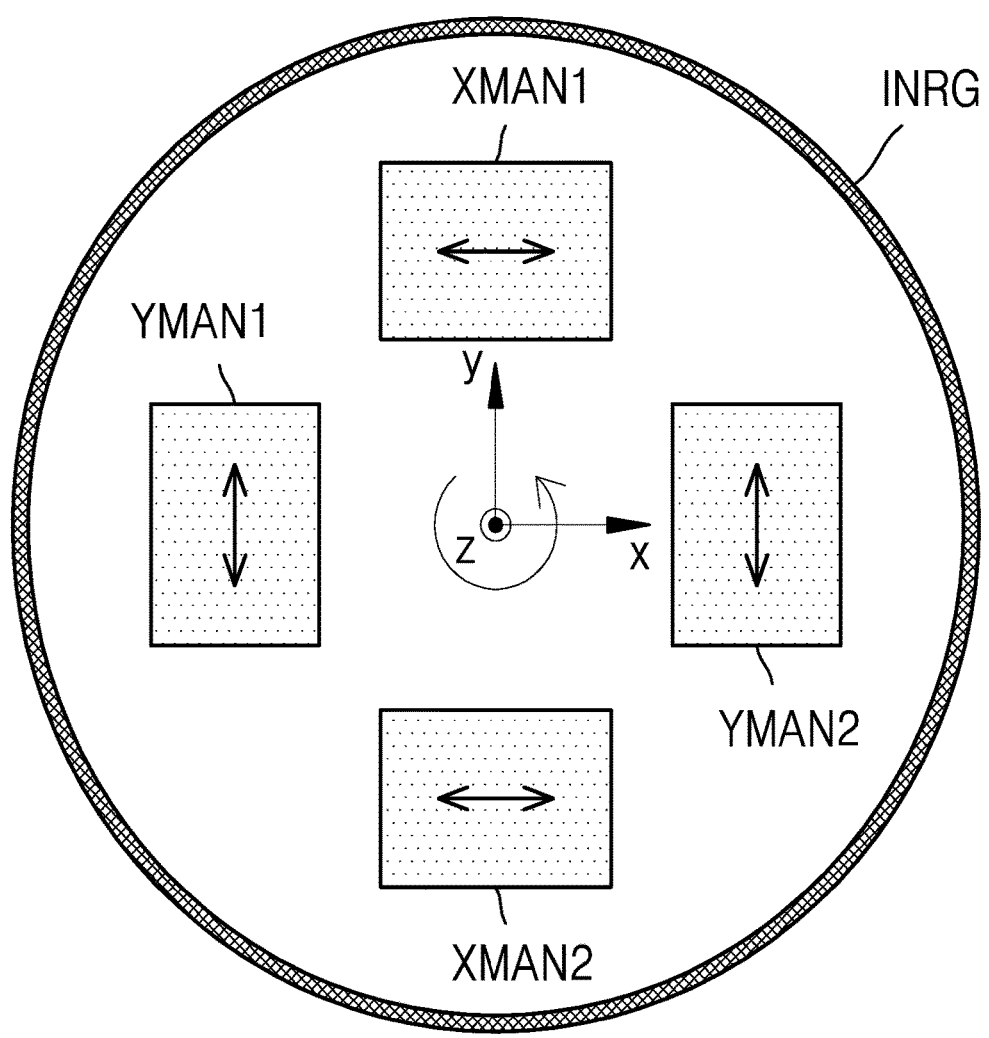
FIG. 4 is a view for describing an operation of a z mass part shown in FIG. 1.

Accordingly, as illustrated in FIG. 4, when rotational movement occurs with respect to the z-axis, vibration and shaking of the first internal x mass body XMAN1 and the second internal x mass body XMAN2 occur in the x-axis direction (in a lateral direction in FIG. 4). In FIG. 4, vibration and shaking of the first internal x mass body XMAN1 and the second internal x mass body XMAN2 in the x-axis direction are expressed by arrows ↔.

In addition, specifically, the y vibration mass element MYM is provided with a first internal y mass body YMAN1 and a second internal y mass body YMAN2. The first internal y mass body YMAN1 and the second internal y mass body YMAN2 are disposed on the x-axis in the internal ring spring INRG. Here, the first internal y mass body YMAN1 and the second internal y mass body YMAN2 are disposed on opposite sides of the reference point PREF.

In addition, the first internal y mass body YMAN1 and the second internal y mass body YMAN2 move in the x-axis direction according to the contraction and expansion of the main spring part GRG and the first internal y mass body YMAN1 and the second internal y mass body YMAN2 may be vibrated and shaken in the y-axis direction.

Accordingly, as illustrated in FIG. 4, when rotational movement occurs with respect to the z-axis, vibration and shaking of the first internal y mass body YMAN1 and the second internal y mass body YMAN2 occur in the y-axis direction (in a vertical direction in FIG. 4). In FIG. 4, vibration and shaking of the first internal y mass body YMAN1 and the second internal x mass body YMAN2 in the y-axis direction are expressed by arrows ↔.

Here, it should be obvious to those skilled in the art that the direction of the rotational movement with respect to the z-axis may be identified through a comparison between a phase and size of the vibration and shaking of the first internal x mass body XMAN1, the second internal x mass body XMAN2, the first internal y mass body YMAN1, and the second internal y mass body YMAN2, and a phase and size of the contraction and expansion of the main spring part GRG.

Continuing to refer to FIG. 1, the sensing part GDE senses the vibration and shaking of the x mass part GXM, the y mass part GYM, the z mass part GZM.

The sensing part GDE is provided with sensor elements 101 to 108 which may sense displacement of the first external x mass body XMAE1, the second external x mass body XMAE2, the first external y mass body YMAE1, the second external y mass YMAE2, the first internal x mass body XMAN1, the second internal x mass body XMAN2, the first internal y mass body YMAN1, and the second internal y mass body YMAN2.

Such sensor elements 101 to 108 may be implemented in various forms such as plate electrodes, comb electrodes, etc. Here, it should be obvious to those skilled in the art that the electrodes of the sensor elements 101 to 108 may be implemented by methods of attaching some of the electrodes to a substrate and disposing the other electrodes at the mass bodies. Thus, a detailed description thereof will be omitted.

Continuing to refer to FIG. 1, the three-axis micro gyroscope according to a preferred embodiment of the present invention is further provided with a substrate SUB and an anchor part GAK.

The main spring part GRG, the x mass part GXM, the y mass part GYM and the z mass part GZM are disposed on the substrate SUB.

In addition, the anchor part GAK is fixed with respect to the substrate SUB and includes first to fourth anchors AK1 to AK4 in contact with a part of the main spring part GRG.

Figure 5:
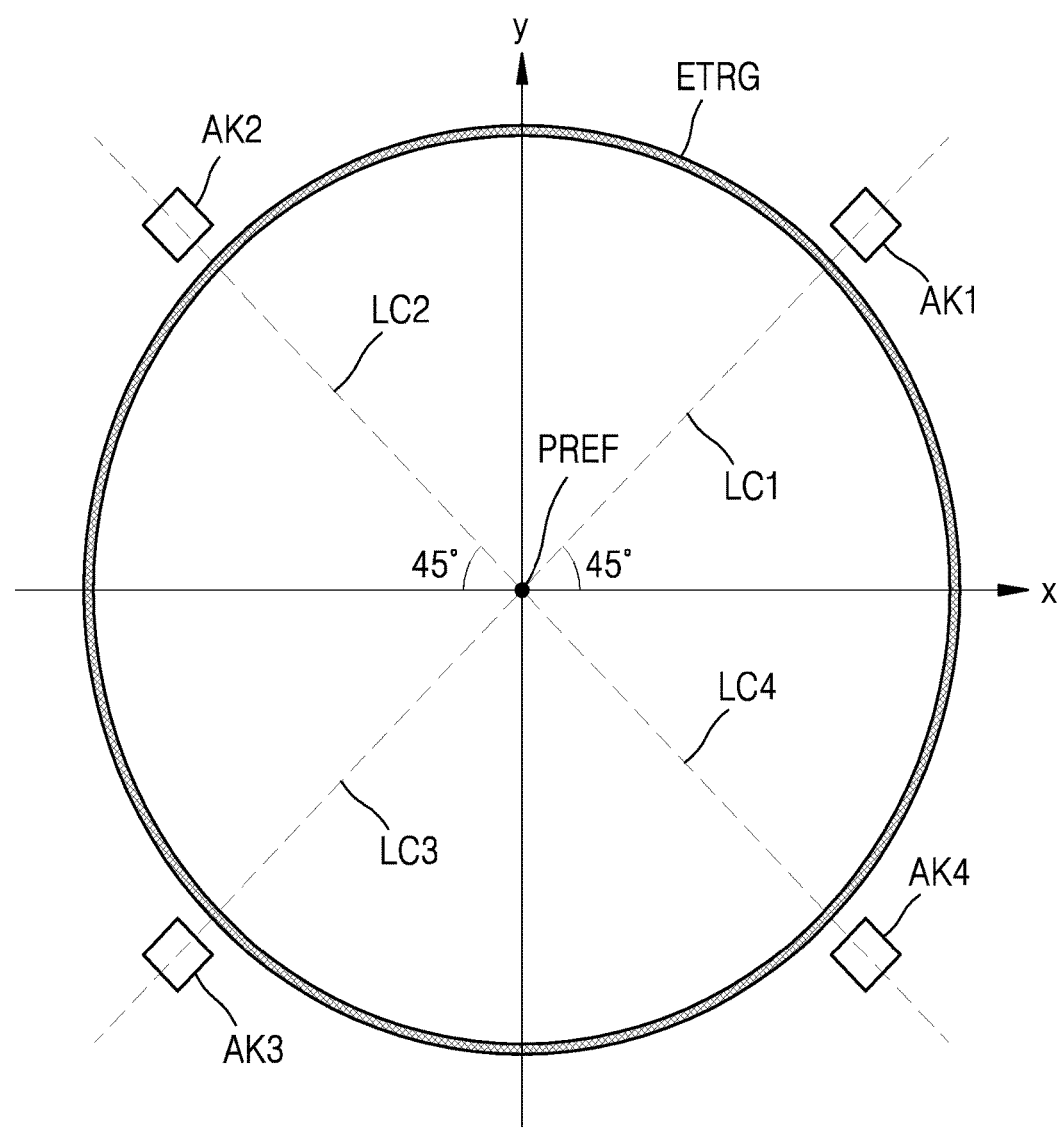
FIG. 5 is a view for describing an arrangement of an anchor part shown in FIG. 1.

Here, as illustrated in FIG. 5, the first to fourth anchors AK1 to AK4 are respectively disposed on first to fourth symmetrical lines LC1 to LC4. Here, each of the first to fourth symmetrical lines LC1 to LC4 crosses the reference point PREF and is a virtual straight line which divides each of first to fourth quadrants of the x-y plane partitioned by the x-axis and y-axis into two parts.

Preferably, the first to fourth symmetrical lines LC1 to LC4 are straight lines, each of which forms 45° angle with respect to the x-axis and y-axis on the first to fourth quadrants of the x-y plane. In addition, the first to fourth anchors AK1 to AK4 come into contact with the main spring part GRG, specifically, with stable points PST1 to PST4 (see FIG. 2) of the external ring spring ETRG.

Here, each of the stable points PST1 to PST4 is one point at which the displacement thereof is minimized when the main spring part GRG, specifically, the external ring spring ETRG is contracted and expanded.

Ideally, when the external ring spring ETRG is implemented in a circular shape, the stable points PST1 to PST4 of the external ring spring ETRG may be positioned at 45° angles with respect to the x-axis and the y-axis from the reference point PREF.

According to the three-axis micro gyroscope of the embodiment of the present invention as described above, an effective measurement of rotational movement with respect to all three axes of x, y, and z may be achieved.

That is, in the three-axis micro gyroscope of the embodiment of the present invention, the main spring part GRG is driven in both the x-axis direction and the y-axis direction. Accordingly, the main spring part GRG may be driven by a large driving force.

In addition, a driving force is exerted on the main spring part GRG in the x-axis direction and the y-axis direction which are perpendicular to each other. In addition, the main spring part GRG symmetrically moves with respect to the reference point PREF. Accordingly, the degree of measurement accuracy of rotating angular velocity with respect to the x-axis and y-axis is improved according to the embodiment of the present invention.

In addition, in the three-axis micro gyroscope of the embodiment of the present invention, displacement of the stable points PST1 to PST4 of the external ring spring ETRG connected to the anchors AK1 to AK4 is minimized. Accordingly, energy loss is decreased and a resonance Q-factor of the main spring is largely improved according to the three-axis micro gyroscope of the embodiment of the present invention.

In addition, in the three-axis micro gyroscope of the embodiment of the present invention, the z mass part GZM for sensing the rotational movement of the center of the z-axis includes the first internal x mass body XMAN1, the second internal x mass body XMAN2, the first internal y mass body YMAN1, and the second internal y mass body YMAN2. Accordingly, an effect occurs in that a gyro band with respect to the rotational movement of the z-axis widens according to the three-axis micro gyroscope of the embodiment of the present invention.

While the present invention has been described in connection with one embodiment illustrated in the drawings, the above-described embodiment should be considered in a descriptive sense only, and it should be obvious to those skilled in the art that various modifications and other equivalent embodiments may be made from the description set forth herein.

For example, an embodiment in which anchors are in contact with the external spring is illustrated and described in the present specification. However, it should be obvious to those skilled in the art that the inventive concept of the present invention may also be implemented by an embodiment in which the anchors are in contact with the internal spring or with both of the internal and external springs instead of being in contact with only the external spring.

Therefore, the scope of the present invention shall be determined according to the technical sprit of the attached claims below.

INDUSTRIAL APPLICABILITY

The present invention can be used in the field of micro gyroscopes.

The invention claimed is:

1. A three-axis micro gyroscope for measuring a rotational movement with respect to an x-axis, a y-axis, and a z-axis which are disposed perpendicular to one another and cross a virtual reference point, the three-axis micro gyroscope comprising:
    a main spring part having elasticity and disposed on an x-y plane in a form of a closed curve including the reference point;
    a driving part which contracts and expands the main spring part with respect to an x-axis direction and a y-axis direction which are complementary to each other;
    an x mass part coupled to the main spring part and allowed to be vibrated and shaken in a z-axis direction while the x mass part moves in the y-axis direction according to the contraction and expansion of the main spring part;
    a y mass part coupled to the main spring part and allowed to be vibrated and shaken in the z-axis direction while the y mass part moves in the x-axis direction according to the contraction and expansion of the main spring part;
    a z mass part including an x vibration mass element and a y vibration mass element, wherein the x vibration mass element is allowed to be vibrated and shaken in the x-axis direction while the x vibration mass element moves in the y-axis direction according to the contraction and expansion of the main spring part and the y vibration mass element is allowed to be vibrated and shaken in the y-axis direction while the y vibration mass element moves in the x-axis direction according to the contraction and expansion of the main spring part; and
    a sensing part which senses the vibration and shaking of the x mass part, the y mass part, and the z mass part.

2. The three-axis micro gyroscope of claim 1, wherein the main spring part is disposed in an oval shape including the reference point.

3. The three-axis micro gyroscope of claim 1, wherein the main spring part is disposed in a circular shape whose center is the reference point.

4. The three-axis micro gyroscope of claim 1, wherein the main spring part includes:
    an external ring spring which is contracted and expanded with respect to the x-axis direction and y-direction which are complementary to each other by the driving part, and
    an internal ring spring included in the external ring spring, including the reference point, and coupled to the external ring spring.

5. The three-axis micro gyroscope of claim 4, wherein the driving part includes:
    an x driving element which exerts a force on the external ring spring in the x-axis direction; and
    a y driving element which exerts a force on the external ring spring in the y-axis direction.

6. The three-axis micro gyroscope of claim 5, wherein:
    the x driving element is disposed on the x-axis outside the external ring spring and is provided with a first x driver and a second x driver disposed on opposite sides of the reference point; and
    the y driving element is disposed on the y-axis outside the external ring spring and is provided with a first y driver and a second y driver disposed on opposite sides of the reference point.

7. The three-axis micro gyroscope of claim 4, wherein:
    the x mass part is provided with a first external x mass body and a second external x mass body disposed on the y-axis between the external ring spring and the internal ring spring and disposed on opposite sides of the reference point; and
    the first external x mass body and the second external x mass body move in the y-axis direction according to the contraction and expansion of the main spring part and are allowed to be vibrated and shaken in the z direction.

8. The three-axis micro gyroscope of claim 4, wherein:
    the y mass part is provided with a first external y mass body and a second external y mass body disposed on the x-axis between the external ring spring and the internal ring spring and disposed on opposite sides of the reference point; and
    the first external y mass body and the second external y mass body move in the x-axis direction according to the contraction and expansion of the main spring part and are allowed to be vibrated and shaken in the z direction.

9. The three-axis micro gyroscope of claim 4, wherein:
    the x vibration mass element is provided with a first internal x mass body and a second internal x mass body disposed on the y-axis in the internal ring spring and disposed on opposite sides of the reference point, and the first internal x mass body and the second internal x mass body move in the y-axis direction according to the contraction and expansion of the main spring part and are allowed to be vibrated and shaken in the x direction; and
    the y vibration mass element is provided with a first internal y mass body and a second internal y mass body disposed on the x-axis in the internal ring spring and disposed on opposite sides of the reference point, and the first internal y mass body and the second internal y mass body move in the x-axis direction according to the contraction and expansion of the main spring part and are allowed to be vibrated and shaken in the y direction.

10. The three-axis micro gyroscope of claim 1, further comprising:
    a substrate on which the main spring part, the x mass part, the y mass part and the z mass part are disposed; and an anchor part fixed with respect to the substrate and including first to fourth anchors in contact with portions of the main spring part and disposed on first to fourth symmetrical lines, wherein each of the first to fourth symmetrical lines is a virtual straight line which crosses the reference point and divides each of first to fourth quadrants of the x-y plane partitioned by the x-axis and y-axis into two parts.

11. The three-axis micro gyroscope of claim 10, wherein the first to fourth symmetrical lines are straight lines, each of which forms 45° angle with respect to the x-axis and the y-axis on the first to fourth quadrants of the x-y plane.

12. The three-axis micro gyroscope of claim 10, wherein:

the first to fourth anchors respectively come into contact with stable points of the first to fourth quadrants of the x-y plane; and each of the stable points of the first to fourth quadrants is one point of the main spring part at which displacement is minimized when the main spring part contracts and expands.

* * * * *